(No Model.)
N. P. COWELL.
CAR BUMPER.
No. 333,447. Patented Dec. 29, 1885.
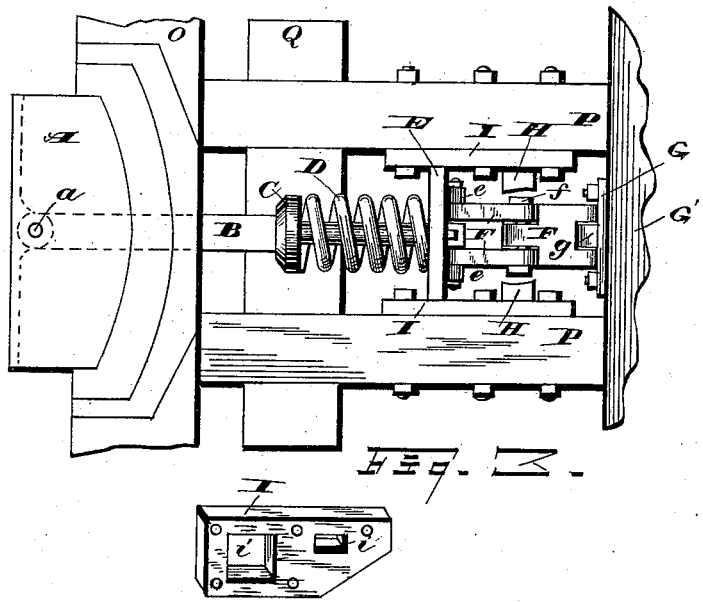
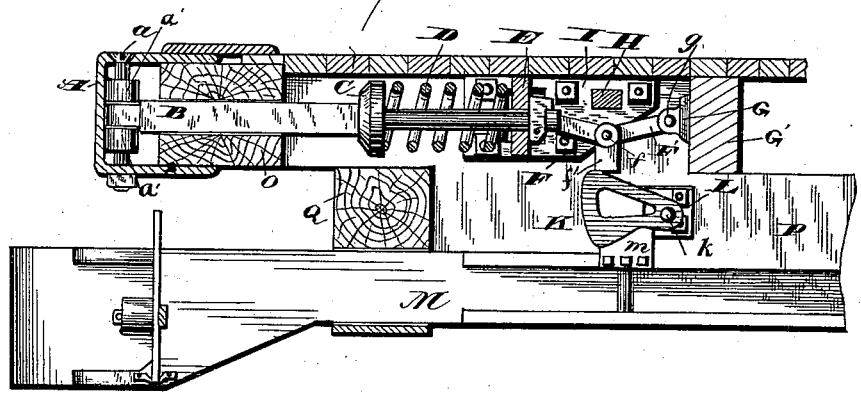
WITNESSES
INVENTOR

UNITED STATES PATENT OFFICE.

NEWELL P. COWELL, OF CLEVELAND, OHIO.

CAR-BUMPER.

SPECIFICATION forming part of Letters Patent No. 333,447, dated December 29, 1885.

Application filed May 26, 1885. Serial No. 166,766. (No model.)

*To all whom it may concern:*

Be it known that I, NEWELL P. COWELL, of Cleveland, in the county of Cuyahoga and State of Ohio, have invented certain new and useful Improvements in Spring Car-Bumpers; and I do hereby declare the following to be a full, clear, and exact description of the invention, such as will enable others skilled in the art to which it pertains to make and use the same.

My invention relates to improvements in spring car-bumpers designed more especially for passenger-coaches, the object being to so arrange the bumper and suitable actuating mechanism that the bumper will be operated automatically by the movement of the draw-bar, by means of which the bumper will advance or recede substantially in unison with the draw-bar, and the tension of the bumper-spring will be kept approximately the same during such movements of the bumper and the draw-bar, to the end that the tension of the bumper-spring is so regulated that no lost motion is had between the cars, even when the draw-bar, either by the relaxation of its spring or by an unusual strain brought to bear upon it is drawn out an unusual distance.

With this object in view my invention consists in certain features of construction and in combination of parts hereinafter described, and pointed out in the claims.

Heretofore with certain classes of car-bumpers designed for passenger-coaches the tension of the bumper-spring was "thrown on" by hand after the coupling of the cars, and usually while the cars were at rest. In moving the cars the draw-bar would of course be drawn out more or less, according to the load, and this would of course separate the cars and reduce the tension on the bumper-spring more or less, according to the distance that the cars were separated. It would follow then that the tension of the bumper-spring with a heavy load, when most needed, would be the least, and would increase as the load was decreased, and would be greatest with no load at all. If the tension of the spring was sufficient to make the bumper operate with the cars widely separated, as with a heavy load, the tension of the spring would be excessive when the cars were together. With such construction the action of the bumper certainly would not be regular. With my improved device the tension of the bumper-spring, being regulated automatically by the movement of the draw-bar, is never excessive, but is kept regular, and the bumper is therefore always effective.

In the accompanying drawings, Figure 1 is a plan view of my improved bumper and attachments. Fig. 2 is an elevation, partly in section, of the bumper and attachments, showing also the draw-bar and connecting mechanism for operating the bumper automatically by the movement of the draw-bar. Fig. 3 is a view in perspective of one of the side plates for supporting the bumper mechanism.

A represents the bumper-plate, secured by the bolt $a$ to the stem B. The bumper-plate is provided inside with the lugs $a'$, that embrace the stem B, and through which the bolt $a$ passes. The rear portions of the plate embrace the platform-sill, as shown. With this construction the face of the opposing buffer-plates can adjust themselves in passing curves in the tracks and under all conditions.

C is a collar rigidly secured to the stem, and forms a seat for one end of the spiral bumper-spring D, the other end of the spring having a seat on the follower-plate E, through which the stem passes with an easy fit. The plate E has tongues (not shown) on the ends, that slide in the mortises $i$ of the side plates, I, and support the follower. The plate F on the rear side has ears $e$, to which are respectively pivoted the links F, that are also pivoted by the bolt $f$ to the link F', that in turn is pivoted to the ear $g$ of the bearing-plate G, the latter being bolted to the car-sill G', the links forming a knuckle-joint for controlling the tension of the spring D and the advancement of the bumper.

H is a cross-bar secured in the mortise $i'$ of the plates I, and extends over the knuckle-joint and forms a stop to limit the upward movement of the joint.

K is a cam or block pivoted at $k$ to the supporting-plate L, that is attached to the draw-timber P. The cam or block above is in contact with the depending arm or lug $f'$ of the knuckle-joint and below rests on the incline $m$, that is attached to the draw-bar M.

O is the platform-sill, Q the truss-block, the frame-work being substantially of the ordinary construction.

In Fig. 2 the normal position of the parts is shown when there is no strain on the draw-bar. In moving the cars the draw-bar is of course drawn out more or less, according to the load, causing a corresponding separation of the cars. The outward movement of the draw-bar by means of the incline $m$ and the connecting mechanism shown advances the follower-plate E, that would compress the spring D if the bumper was held rigid; but, the bumper being movable, the spring reacts on the collar C and advances the bumper, by means of which the opposing bumpers are kept in contact, so that no lost motion is had, and substantially an even tension is had on the spring D in whatever position the draw-bar may be. The tension on the spring is therefore never excessive, and the bumper is always operative.

What I claim is—

1. The combination, with a spring car-bumper, a follower-plate forming the rear seat for the bumper-spring, a knuckle-joint arranged to actuate the follower-plate to control the tension of the bumper-spring and the movement of the bumper, of a draw-bar, incline, and suitable connecting mechanism, whereby the knuckle-joint is automatically operated by the movement of the draw-bar, substantially as set forth.

2. In a spring car-bumper, a knuckle-joint arranged to regulate the tension of the bumper-spring, and a pivoted cam or block arranged between the knuckle-joint and draw-bar, the latter having a suitable projection for automatically actuating the tension mechanism of the movement of the draw-bar, substantially as set forth.

3. The combination, with a spring-actuated bumper-stem, of a bumper-plate hinged to said stem and embracing or overlapping the platform-sill, substantially as set forth.

In testimony whereof I sign this specification, in the presence of two witnesses, this 18th day of May, 1885.

NEWELL P. COWELL.

Witnesses:
CHAS. H. DORER,
GEO. W. KING.